United States Patent [19]
Bracke

[11] 3,759,197
[45] Sept. 18, 1973

[54] PROCESS FOR THE AGGLOMERATION OF PARTICULATE MATERIALS
[76] Inventor: William J. I. Bracke, Ransbeekstraat 120, Bruxelles, Belgium
[22] Filed: Sept. 22, 1971
[21] Appl. No.: 182,905

[52] U.S. Cl.................... 111/1, 47/DIG. 10, 61/36, 117/3, 117/6, 117/100 B
[51] Int. Cl............................................... E02d 3/12
[58] Field of Search................. 117/100 B, 161 LN, 117/161 AU; 61/36 XA, 36 A, 36 R; 47/DIG. 10, 58; 111/1

[56] References Cited
UNITED STATES PATENTS
3,651,002  3/1972  Higashimura et al........... 61/36 R X
3,286,475  11/1966  Adams................................ 61/36 R
2,886,474  5/1959  Kine et al...................... 117/161 AU
2,616,818  11/1952  Azorlosa...................... 117/155 UA
3,677,014  7/1972  Stout et al........................... 61/36 R
3,544,507  12/1970  Lloyd........................... 117/100 B X
3,633,310  1/1972  Sandiford................................ 47/58

Primary Examiner—William D. Martin
Assistant Examiner—Shrive P. Beck
Attorney—M. N. Cheairs

[57] ABSTRACT

A process for the agglomeration of particulate material comprising contacting said particulate material with an aqueous solution of polymer of acrylamide and an aqueous solution of dialdehyde having the formula $O = CH - (R)_n - CH = O$, where R is a divalent hydrocarbon radical having from 1 to 8 carbon atoms, and $n$ is 0 or 1, at a temperature in the range from 0° to 100°C.

10 Claims, No Drawings

PROCESS FOR THE AGGLOMERATION OF PARTICULATE MATERIALS

This invention relates to a process for the agglomeration of particulate materials to form stable aggregates.

Techniques for the formation of stable aggregates from particulate materials find a wide variety of applications, such as for the solidification of soils for the construction of buildings or runways, well drilling, tunnel construction, dune and soil stabilization against erosion, manufacture of coal dust agglomerates, shell moulding, and the like.

Processes have been suggested for producing agglomerates from particulate materials, namely by coating and eventually impregnating the particles with polymers of acrylamide which are then cross-linked. However, in such known processes, the cross-linking requires the copolymerization of acrylamide with another expensive monomer, such as alkylidene-bis-acrylamide, by means of which the cross-linking is performed, or it requires a long heating operation and the presence of special additives. These known processes generally have been found economically unattractive and have few uses.

An object of the present invention is to provide a simple and economical process for agglomerating particulate materials. Another object of the present invention is to provide a flexible process, allowing the treatment of a wide variety of particulate materials in order to obtain bulkier and stable aggregates. A further object of the present invention is to provide a process for agglomerating soil particles, for the purpose of improving the structure of poor soils or of stabilizing the structure of good soils.

According to the present invention, the process comprises contacting solid particulate materials with an aqueous solution of polymer of acrylamide and an aqueous solution of a dialdehyde having the general formula $O=CH-(R)_m-CH=O$, where R is a divalent, substituted or unsubstituted hydrocarbon radical, having from 1 to 8 carbon atoms, and n is 0 or 1, at a temperature from 0° to 100°C.

The terms "acrylamide polymer" and "polyacrylamide" used hereinabove and throughout the following description are to be understood to cover both the homopolymers of acrylamide and copolymers based on acrylamide, such as those of acrylamide copolymerized with a monomer or monomers chosen from acrylic acid, methacrylic acid, their esters, acrylonitrile and/or other vinylic or polyolefinic monomers. Generally, the acrylamide polymer has a molecular weight higher than 5,000, preferably between 50,000 and 1,500,000. Higher molecular weights produce viscous solutions which are not easily handled.

The concentration of the aqueous solution of polyacrylamide as well as the quantity of solution to be used depend on several factors, particularly on the type of agglomerates required. Generally the solution of acrylamide polymer contains from 0.5 to 10 percent by weight of polyacrylamide. More concentrated solutions are too viscous and difficult to spread over the particles, whereas excessively diluted solutions result in the presence of an unnecessary amount of water. Preferably, the aqueous solutions contain from about 1 to 4 percent, and more particularly from about 1 to 2 percent by weight of the polymer of acrylamide.

When particulate material as soil is processed to agglomerate the solid particles and form stable aggregates which however allow the air to penetrate easily to the underlying layers through the interstices between the aggregates and permit retention of moisture, the amount of aqueous solution of acrylamide polymer used generally is sufficient to provide acrylamide polymer (calculated on a dry basis) of from 0.5 to 5, and more particularly from 1 to 3, parts by weight per 1000 parts by weight of particulate material.

To obtain more compact agglomerates, for example for solidification of building land, for stabilization of soils for drilling purposes, for production of moulding shell, and the like, the quantity of acrylamide polymer employed is greater than the above amounts. However, in this utility, the amount of acrylamide polymer seldom will exceed 50 parts by weight (calculated on a dry basis) and more generally such amount will be within the range of 10 to 20 parts by weight per 1000 parts by weight of particulate material. No advantage is obtained from the use of greater amounts of polymer.

The dialdehyde which is contacted with the particulate matter along with the aqueous solution of acrylamide polymer generally is one which is water soluble. Such dialdehyde is also one having the formula $O=CH-(R)_n-CH=O$ wherein R is a divalent hydrocarbon radical of 1 to 8 carbon atoms and $n$ is 0 or 1. The choice of the particular dialdehyde to use depends primarily on economic factors and, in that respect, aliphatic dialdehydes are preferably used. Particularly useful are malonic, succinic and glutaric dialdehydes and, preferably, glyoxal $O=CH-CH=O$.

The quantity of the dialdehyde employed is such that not more than one aldehyde group is present for each amide group of the acrylamide polymer. No gelification of the polymer occurs with higher proportions of dialdehyde. More particularly in the case of glyoxal, the quantity employed is in the range of 0.25 to 10 percent of the weight of dry acrylamide polymer.

At ambient temperatures, gelification of the acrylamide polymer occurs in the presence of the dialdehyde, but for most applications, takes place somewhat slower than desired. The gelification rate may be hastened by adding a basic compound in order to have a pH higher than 7, more particularly a pH within the range of about 7.5 to 9. The pH influences not only the gelification rate of the polymer, but also the stability of the formed gel. Thus, the choice of the pH depends largely on the application considered for the process of the present invention. For example, for soil stabilization, the gel is preferably formed more slowly in order to allow the spreading of the mixture on the soil, but is also desirable that the formed aggregate remain stable for a long period. To accomplish these objectives, the pH of the reaction mixture preferentially is about 8 to 8.5. The pH modifying agents are basic compounds which are relatively inert to the polymer and the dialdehyde. Such basic compounds are more particularly inorganic compounds, such as alkali and alkaline earth hydroxydes or salts, i.e., alkaline carbonates or phosphates. Among such compounds are NaOH, KOH, $Na_2CO_3$, $Na_3PO_4$, $Ca(OH)_2$, and the like.

The process of the present invention is simple to carry out and requires only minimal care in operation. For example, in practicing the preferred mode of the process of the present invention employing a basic compound, the process may be carried out either by mixing the aqueous solutions of acrylamide polymer and dialdehyde and then adding the basic compound or by first adding said basic compound to the aqueous solution of either the acrylamide polymer or the dialdehyde reactant and then adding the other reactant.

The process for agglomerating particulate material according to the present invention is particularly valuable for the treatment of soils, to improve the structure of poor soils or to maintain the structure of good soils. The formed aggregates prevent erosion and restrict surface soil movements under the action of wind or rain. Moreover, they permit the soil to breathe and make easy the penetration into the soil of rain or irrigation water, which infiltrates through the interstices between the aggregates and into the capillary passages of said stable aggregates. As a result, the germination of seeds and the growth of plants are made easier.

Another advantage of the process of the present invention lies in the fact that it may be applied for the improvement of the structure of soils either before, during or after seeding of said soils, the compounds used in the present process not being toxic and not having any unfavorable effect on the seeds and on the plants. In fact, the seeds can be dispersed into the solution of polyacrylamide or the dialdehyde, a stream of this solution being then mixed with a stream of the solution of dialdehyde or polyacrylamide, as the case may be, and basic compound, before spraying on the soil. The gelification time may be controlled to allow the treatment of a large area of soil before gelation of the mixed solutions.

In treating soil in accordance with the process of the present invention, generally, from 5 to 500 g of polyacrylamide are used per m² of the soil, the specific amount depending on such factors as structure of the soil, wanted degree of agglomeration, and the like.

The invention will now be further described by reference to the following examples:

EXAMPLE 1

In six experiments, 0.1 ml of a 30 percent aqueous solution of glyoxal and 10 ml of an aqueous solution of sodium carbonate were added to 100 ml of a 2 percent aqueous solution of polyacrylamide. The amount of sodium carbonate in the aqueous solution and thus, the pH was varied from experiment to experiment. The gelification time of the polymer was determined at 20°C as a function of the pH of the reaction mixture in each experiment. The results are given in Table I below.

TABLE I

| Concentration of the aqueous solution of $Na_2CO_3$ (in %) | 2 | 1.6 | 1.2 | 0.8 | 0.4 | 0.2 |
|---|---|---|---|---|---|---|
| pH of the reaction mixture | 11 | 10.8 | 10.5 | 10 | 9.2 | 8.5 |
| Gelification time (in seconds) | 150 | 180 | 240 | 330 | 840 | 1750 |

EXAMPLE 2

Aqueous solutions of polyacrylamide and glyoxal were mixed as described in Example 1 and aqueous solutions of different basic compounds were then added to different portions of the mixture. In all cases the pH obtained was 9.

The gelification time was determined at 20°C as a function of the nature of the basic compound. The results of these tests are shown in Table II.

TABLE II

| Basic compound | Gelification time |
|---|---|
| $Na_4P_2O_7$ | 14 minutes |
| $Na_3PO_4$ | 15 minutes |
| KOH | 13 minutes |
| $Ca(OH)_2$ | 13½ minutes |

EXAMPLE 3

Two tests were carried out by mixing an aqueous solution of polyacrylamide with an aqueous solution of two different dialdehydes and with an aqueous solution of NaOH to have a pH of 8.5. The amount of dialdehyde added corresponded to about 1 aldehyde group for 30 amide groups of the polymer.

These tests were carried out at 20°C and the gelification time was determined as a function of the type of dialdehyde. The results are given in Table III.

TABLE III

| Dialdehyde | Gelification time |
|---|---|
| Succinic dialdehyde | 28 minutes |
| Glutaric dialdehyde | 30 minutes |

EXAMPLE 4

100 ml of a 2 percent aqueous solution of a copolymer containing 85 percent by weight of acrylamide and 15 percent by weight of methyl acrylate were mixed with 0.2 ml of a 30 percent aqueous solution of glyoxal and 10 ml of a 0.4 percent aqueous solution of sodium carbonate, at 50°C.

The gelification time was lower than 5 minutes.

EXAMPLE 5

Varying amounts of a 2 percent aqueous solution of polyacrylamide having a molecular weight of about 200,000, and containing 0.1 percent by weight of glyoxal, said solutions having a pH of 8.5, were added at 20°C to 1,500 g of sand having dimensions lower than 2 mm.

For each of the tests, the degree of agglomeration of sand was determined (degree of agglomeration = percentage proportion of particles agglomerated into aggregate sizes exceeding 2 mm).

The results of the test are given in the following Table IV.

TABLE IV

| Quantity of added solution | Weight percentage of polymer | Degree of agglomeration |
|---|---|---|
| 36 ml | 0.5 % | 12.8 % |
| 75 ml | 1 % | 30 % |
| 150 ml | 2 % | 70 % |
| 300 ml | 4 % | 75.3 % |

EXAMPLE 6

In a 250 liter tank, 200 liter of a 2 percent polyacrylamide solution, 0.2 liter of a 30 percent solution of glyoxal and 20 liter of a 0.2 percent solution of sodium carbonate were mixed. The mixture was sprayed on sand dunes at a rate of 1.5 l/m². The gelification took place 30 minutes after the time of mixing. Due to the good impregnation of the sand particles by the mixture and the gelification of said mixture, the erosion of the dunes by wind was prevented.

EXAMPLE 7

In one of the compartments of a two-compartment tank car, equipped with a circulation pump, was placed 4,000 liter of a 2 percent aqueous solution of polyacrylamide, having dispersed therein 20 Kg of grass seeds.

The pH of said solution was brought to 8.5 by adding sodium carbonate. The other compartment of the tank car contained 40 liter of a 30 percent aqueous solution of glyoxal.

The polyacrylamide solution was mixed with the glyoxal solution in a volume ratio of 100:1. This was done by using two pumps moving a constant volume of each of the solutions per time unit. The two streams of solutions were brought together into an applicator, 20 cm before the spraying nozzles of the applicator. About 2 liter of mixed product was used per square meter of soil.

In one particular case where this process was used, the land had an inclination of about 70°. The soil was perfectly stabilized and the seeds stayed in place. No erosion and no surface soil movement was observed after three days of heavy rain.

What is claimed is:

1. A process for the agglomeration of particulate material into bulkier and stable aggregates, comprising contacting said particulate material with an aqueous solution of a polymer consisting essentially of acrylamide, the concentration of said polymer in said solution being between about 0.5 and about 10 percent by weight, and an aqueous solution of a dialdehyde having the formula $O = CH - (R)_n - CH = O$, where R is a divalent alphatic hydrocarbon radical having from 1 to 8 carbon atoms, and $n$ is 0 or 1, at a pH from about 7 to about 11 and at a temperature in the range from 0° to 100°C., said aqueous solution of polymer being used in an amount sufficient to deposit from about 0.5 to about 50 parts by weight of dry polymer per 1,000 parts by weight of particulate material, whereupon crosslinking of said acrylamide polymer takes place and agglomeration of the particulate material results.

2. The process of claim 1 wherein the polymer of acrylamide has a molecular weight higher than 5,000.

3. The process of claim 2 wherein the polymer of acrylamide has a molecular weight of between 50,000 and 1,500,000.

4. The process of claim 1 wherein the dialdehyde is an aliphatic dialdehyde.

5. The process of claim 1 wherein the aldehyde is glyoxal.

6. The process of claim 1 wherein said dialdehyde is employed in an amount not exceeding one aldehyde group per one amide group of the polymer of acrylamide.

7. The process of claim 1 wherein said particulate material is particles of soil.

8. The process of claim 1 wherein the concentration of the polymer of acrylamide in said aqueous solution is between about 1 and about 4 percent by weight.

9. The process of claim 7 wherein said polymer of acrylamide is applied to the surface of said soil in an amount of from about 5 to 500 grams per square meter of soil.

10. The process of claim 7 further comprising dispersing seeds into either said solution of acrylamide polymer or said solution of dialdehyde.

* * * * *